US008890355B2

(12) United States Patent
Maier et al.

(10) Patent No.: US 8,890,355 B2
(45) Date of Patent: Nov. 18, 2014

(54) POWER DISTRIBUTION ARCHITECTURE FOR AIRCRAFT

(75) Inventors: Josef Maier, Munningen (DE); Michael Beutel, Hausen (DE)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 700 days.

(21) Appl. No.: 12/752,447

(22) Filed: Apr. 1, 2010

(65) Prior Publication Data
US 2011/0037315 A1 Feb. 17, 2011

(30) Foreign Application Priority Data

Aug. 13, 2009 (DE) .......................... 10 2009 037 465

(51) Int. Cl.
*H02G 3/00* (2006.01)

(52) U.S. Cl.
CPC ...................................... *H02G 3/00* (2013.01)
USPC .......................... 307/9.1; 307/10.1; 244/118.5

(58) Field of Classification Search
CPC ....................................................... H02G 3/00
USPC ....... 307/9.1, 19; 244/58, 53 R, 135 R, 118.5
See application file for complete search history.

(56) References Cited

U.S. PATENT DOCUMENTS

| | | | |
|---|---|---|---|
| 4,419,588 A | 12/1983 | Goiset | |
| 5,936,318 A | 8/1999 | Weiler et al. | |
| 6,664,656 B2 | 12/2003 | Bernier | |
| 6,704,625 B2 | 3/2004 | Albero et al. | |
| 6,778,414 B2 | 8/2004 | Chang et al. | |
| 6,782,346 B2 | 8/2004 | Bond et al. | |
| 6,845,630 B2 | 1/2005 | Bruno et al. | |
| 7,098,555 B2 | 8/2006 | Glahn et al. | |
| 7,116,003 B2 | 10/2006 | Hoppe | |
| 7,339,809 B2 | 3/2008 | Bennett et al. | |
| 7,429,190 B2 | 9/2008 | Hueber | |
| 7,495,353 B2 | 2/2009 | Christensen et al. | |
| 7,922,117 B2 * | 4/2011 | Wavering et al. | 244/58 |
| 2003/0016520 A1 * | 1/2003 | Cooney et al. | 361/826 |
| 2004/0070269 A1 * | 4/2004 | Anwar et al. | 303/152 |
| 2004/0201972 A1 * | 10/2004 | Walesa | 361/788 |
| 2006/0174629 A1 * | 8/2006 | Michalko | 60/774 |
| 2007/0194625 A1 | 8/2007 | Maier | |
| 2007/0267540 A1 * | 11/2007 | Atkey et al. | 244/58 |
| 2008/0122289 A1 * | 5/2008 | Best et al. | 307/25 |
| 2009/0015063 A1 * | 1/2009 | Michalko | 307/19 |
| 2009/0273234 A1 * | 11/2009 | Wavering et al. | 307/9.1 |

* cited by examiner

*Primary Examiner* — Jared Fureman
*Assistant Examiner* — Toan Vu
(74) *Attorney, Agent, or Firm* — Carlson, Gaskey & Olds P.C.

(57) ABSTRACT

An aircraft power distribution architecture includes a power rail extending generally along the length of an aircraft for receiving power from a generator, and for distributing power through plug-in modules located along the length of the power rail.

12 Claims, 1 Drawing Sheet

POWER DISTRIBUTION ARCHITECTURE FOR AIRCRAFT

RELATED APPLICATION

This application claims priority to German Application No. 10 2009 037 465.5, which was filed Aug. 13, 2009.

BACKGROUND

This application relates to a power distribution architecture for an aircraft, wherein power rails are utilized to eliminate the requirement of central distribution centers.

Traditional power distribution architectures for aircraft were either centralized, with both generator and APU power supplies coming in separately to a power center, and then outputs for primary and secondary distribution leaving the power center. This required relatively long connections between the power center and the several power components.

A second type architecture utilized distributed secondary power distribution networks. However, large, heavy primary distribution centers were still required.

SUMMARY

An aircraft power distribution architecture includes a power rail extending generally along the length of an aircraft for receiving power from a generator, and for distributing power through plug-in modules located along the length of the power rail.

These and other features of the present invention can be best understood from the following specification and drawings, the following of which is a brief description.

These and other features of the present invention can be best understood from the following specification and drawings, the following of which is a brief description.

DETAILED DESCRIPTION

Figures 1A, 1B, 2, 3, 4:
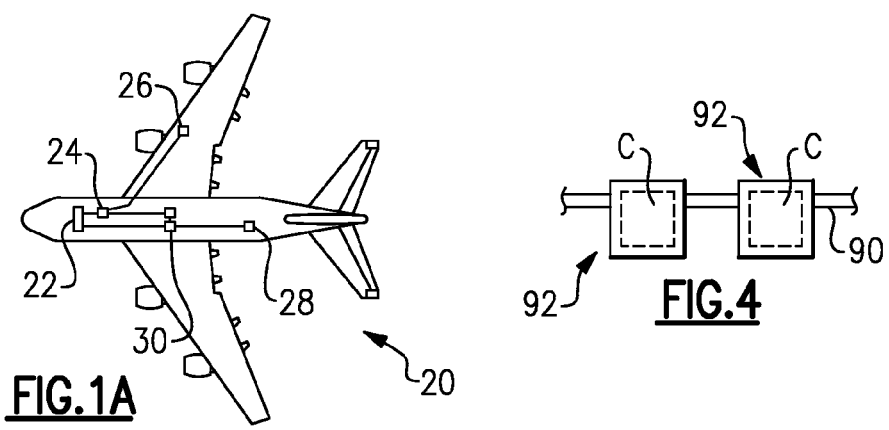
FIG. 1A schematically shows a prior art aircraft.
FIG. 1B shows a power distribution center architecture as utilized in the FIG. 1A embodiment.
FIG. 2 also shows a prior art power distribution architecture.
FIG. 3 shows the inventive power distribution architecture.
FIG. 4 shows a feature of the invention.

FIG. 1A shows an aircraft architecture 20 incorporating a power center 22, which receives all power and then distributes power to various components such as an avionics computer 24, a sensor 26, a load 28, and a relay 30.

As shown in FIG. 1B, power from the generators 30 and 32 is delivered through separate lines into a power center 22. Similarly, power from an APU generator 34 is delivered through a separate line into the power center 22. From the power center 22, power is distributed to various components 40, 42 along separate electric lines.

An external power supply connection 41 may also be included.

As shown in FIG. 2, another prior art architecture 50 incorporates power distribution center 60 which takes in power from the main generators 64 and 66, and the APU 62, all through separate lines, and delivers that power either directly through lines 65, or indirectly through line 166 to secondary power distributions 67 to other components 69.

FIG. 3 shows the inventive power distribution architecture 80. In power distribution architecture 80, power rails 90/88 are utilized, and distribute power along the length of the aircraft to be utilized by various components at different locations on the aircraft. The APU 86 delivers its power directly into the power rail, as do the generators 82 and 84. An external power supply connection 100 may deliver power directly into the power rail. Generators 82/84 may be associated with the gas turbine engines powering the aircraft. The power rails are provided with a plurality of plugs 92 which can distribute power to a secondary distribution location 94, which in turn distributes to a plurality of components 97, or the plug-ins 92 can deliver power to a plurality of components 97 directly. Among the components may be a line 96 to a pump and line 98 to a galley.

As is apparent from FIG. 3, either power rail 90 or 88 receives power from the generators 82 and 84 at an intermediate position, and supplies power in both a forward and rearward direction relative to the aircraft. In addition, as is apparent, there are components utilizing the power located on the power rails at locations intermediate the APU 86, and the generators 82/84.

In the prior art, control components such as the generator control units, or transformer rectifier units, power converters, motor drives, solid state power converter modules, are all housed in the primary distribution modules or the power centers. In this invention, each of the control components are associated with the plug-ins, and provided as is necessary dependent on the components which are controlled by the particular plug-in. Thus, there are plural controls spaced along the power rails. In FIG. 4, the generator control units, transformer rectifier units, power converters, motor drives, and solid state power converter modules are schematically illustrated as C and are incorporated into the plug-in modules (or plug-ins), which are illustrated at 92.

The present invention thus eliminates the need for redundant wiring, and provides direct power to the loads from the power rail which can extend along the length of the aircraft. The power rails can be utilized with either AC or DC current, and appropriate rectifiers and transformers provided to change the current as required.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. An aircraft power distribution architecture comprising:
   a power rail, said power rail extending generally along the length of an aircraft and receiving power directly from a generator, for distributing power through a plurality of plug-in modules located along the length of the power rail; and
   said power rail receiving power directly from said generator at an intermediate position, said power rail directly connected to said generator without an intermediate power distribution center, and wherein said power rail supplies power in both a forward and rearward direction relative to the aircraft.

2. The architecture as set forth in claim 1, wherein an external power source may also communicate power into the power rail.

3. The architecture as set forth in claim 1, wherein some of said plurality of plug-in modules allow the connection of a plurality of components to the power rail.

4. The architecture as set forth in claim 3, wherein the plug-in modules may receive a secondary power distribution module, and control elements may be associated with the plug-in module.

5. The architecture as set forth in claim 4, wherein said control elements may include a transformer rectifier unit.

6. The architecture as set forth in claim 5, wherein said control elements include a generator control unit.

7. The architecture as set forth in claim 1, wherein said plug-in modules include solid state power control modules.

8. The architecture as set forth in claim 1, wherein an auxiliary power unit supplies power directly into said power rail without an intermediate power distribution center.

9. The architecture as set forth in claim 8, wherein said auxiliary power unit is to be located adjacent a rear portion of the aircraft.

10. The architecture as set forth in claim 9, wherein at least some of said modules are located at a location intermediate said generators and said auxiliary power unit.

11. The architecture as set forth in claim 8, wherein at least some of said modules are located at a location intermediate said generators and said auxiliary power unit.

12. An aircraft power distribution architecture comprising:

a power rail, said power rail extending generally along the length of an aircraft and receiving power directly from a generator, for distributing power through a plurality of modules located along the length of the power rail;

said power rail receiving power directly from said generators at an intermediate position, said power rail directly connected to said generator without an intermediate power distribution center, and wherein said power rail supplies power in both a forward and rearward direction relative to the aircraft;

an auxiliary power unit supplying power directly into said power rail without an intermediate power distribution center;

said auxiliary power unit to be located adjacent a rear portion of the aircraft; and at least some of said modules being located at a location intermediate said generator and said auxiliary power unit.

* * * * *